United States Patent

Bradfield

Patent Number: 5,096,035
Date of Patent: Mar. 17, 1992

[54] SPEED AND TORQUE LIMITING INDIRECT DRIVE MECHANISM

[75] Inventor: Michael D. Bradfield, Anderson, Ind.

[73] Assignee: General Motors Corporation, Detroit, Mich.

[21] Appl. No.: 687,663

[22] Filed: Apr. 19, 1991

[51] Int. Cl.⁵ ............................................. F16D 43/24
[52] U.S. Cl. .......................... 192/104 B; 192/105 CE; 192/103 B
[58] Field of Search ......... 192/104 B, 105 CE, 103 B, 192/105 CD

[56] References Cited

U.S. PATENT DOCUMENTS

| | | | |
|---|---|---|---|
| 1,658,279 | 2/1928 | Barton et al. | 192/104 B |
| 3,204,737 | 9/1965 | Anner | 192/105 |
| 3,724,622 | 4/1973 | Barbulesco et al. | 192/105 CE |
| 4,262,552 | 4/1981 | Honda | 192/104 B X |
| 4,296,852 | 10/1981 | Luerken | 192/104 B |
| 4,540,075 | 10/1985 | Delpercio et al. | 192/58 R |
| 4,540,381 | 9/1985 | Molloy et al. | 464/29 |
| 4,610,343 | 9/1986 | Hikari | 192/105 BA |
| 4,667,537 | 5/1987 | Sivalingham | 74/752 E |
| 4,728,315 | 3/1988 | Schlagmüller | 192/104 B X |
| 4,850,466 | 7/1989 | Rogakos et al. | 192/78 |
| 5,010,994 | 4/1991 | Heireth et al. | 192/104 B X |

FOREIGN PATENT DOCUMENTS 832894 4/1960 United Kingdom ......... 192/105 CE

*Primary Examiner*—Leslie A. Braun
*Assistant Examiner*—Andrea Pitts
*Attorney, Agent, or Firm*—Patrick M. Griffin

[57] ABSTRACT

An alternator drive clutch limits alternator speed and prevents belt slippage through the use of specially designed and oriented centrifugal weights. Each weight is pivoted to the alternator shaft inside of a drum wall on the pulley and asymmetrically oriented so that rapid rotation pivots a friction pad on the weight progressively away from the drum wall. Acting in opposition, tension springs pull the pads toward the drum wall. An equilibrium of pad to drum wall slippage is reached such that the alternator does not rotate above a safe speed, but turns one-to-one with the pulley at low speeds. At any speed, high acceleration or deceleration can cause the pads to slip before the belt slips on the pulley, preventing belt chirp.

2 Claims, 4 Drawing Sheets

SPEED AND TORQUE LIMITING INDIRECT DRIVE MECHANISM

This invention relates to rotating drive mechanisms in general, and specifically to a clutch that drives a rotating member indirectly so as to limit the speed of rotation and so as to limit the transferred torque.

BACKGROUND OF THE INVENTION

Rotating vehicle accessories, such as the alternator, are powered by an engine driven belt that is subject to the same speed variations and the same accelerations and decelerations as the engine. Generally, the alternator is directly driven by the belt through a pulley fixed to the alternator shaft. The belt wraps and grips the pulley, rotating it and the alternator shaft in one direction. This creates a tight and a slack belt side. Two problems are created by direct drive. One is the problem of efficiently running the alternator. At low engine and belt speeds, it is desirable that the pulley ratio be as large as possible. This assures that the alternator output, which is proportional to its speed, will be sufficient at low belt speeds. The alternator cannot be run too fast without damage, however, so there is an upper limit on the pulley ratio.

Another problem arises from the fact that an alternator has a significant resistance to being rotated, especially at high rates of acceleration, due both to its rotational inertia and the electrical resistance that any generator has to being turned. Likewise, the rotating alternator resists any force attempting to quickly brake it. The belt turns the pulley only by virtue of the strength of its grip thereon. If the alternator's resistance to high acceleration exceeds the belt grip, the belt can slip on the pulley, causing a fleeting but unpleasant noise called belt "chirp". Likewise, alternator resistance to being rapidly braked can cause belt slip in the other direction. In fact, since belt acceleration forces are directed toward the tight side of the belt and deceleration forces toward the slack side, the belt is less able to brake the alternator without slipping than it is to accelerate it, even though acceleration forces are generally greater in magnitude.

Various alternator drives have been proposed that would provide one-to-one drive at low speeds, but less than one-to-one at high pulley speeds, so as to allow the use of a large pulley ratio without exceeding the upper speed limit. These include electromechanical clutches, continuously variable transmissions, viscous clutches and continuously variable transmissions. Likewise, various torque limiting devices have been proposed to prevent belt chirp, such as overrunning clutches. None has found real commercial acceptance, because of cost, size and complexity. A practical and compact indirect drive clutch that solved both problems would be useful for alternators or other accessories.

SUMMARY OF THE INVENTION

The invention provides a clutch that meets the need noted above. A very few mechanical components, which are packaged in a compact volume and which operate automatically in response to speed and acceleration variations, work cooperatively both to limit speed and prevent belt slip.

The invention is used in conjunction with a standard shaft driven alternator. The belt wraps the pulley to create a tight and a slack side, so that deceleration forces are more likely to create belt slip than the stronger acceleration forces.

In the preferred embodiment disclosed, the clutch includes a cylindrical drum wall formed integrally with the pulley that coaxially surrounds the end of the alternator shaft. The drum transmits all, or a lesser fraction, of the pulley rotation to the alternator shaft through a special mechanism that responds both to speed and to the magnitude and direction of belt acceleration.

Three evenly spaced spring loaded centrifugal weights are pivoted to the end of shaft inside the drum wall. Each weight has the general shape of a circular segment slightly smaller than the drum wall, and so has some radial clearance from the drum wall. Mounted to one of each weight is an arcuate pad of friction material that conforms to the drum wall, while the other end includes a spring hook. Each weight is pivoted in an orientation such that the direction of rotation of the pulley runs from the friction pad end to the hook end of the weight. As the friction pad end of the pivoting weight moves closer to the drum wall, the hook end moves away, and vice versa. The pivot is not in the center of the weight, however, but is offset toward the friction pad end. Consequently, the weight is asymmetrically distributed, and the centrifugal force induced on it by the rotation of the alternator shaft will tend to rotate the hook end out and the friction pad in and away from the drum wall. Opposing this, the hook ends of the weights are pulled inwardly by tension springs, which gives the friction pads a continual normal force against the drum wall.

The strength of the springs, the distribution and orientation of the weights, and the coefficient of friction of the pads all cooperate to create a characteristic net torque response of the clutch, which is a function of alternator speed and of the direction, though not magnitude, of pulley acceleration. At moderate speeds, the springs force the pads into the drum wall with enough normal force to create enough friction to substantially prevent slippage. The shaft is driven one-to-one with the pulley, and, with a large enough pulley ratio, the speed and output of the alternator will be high enough, even at low pulley speeds. At higher speeds, where the upper speed limit of the alternator is approached, centrifugal force counteracts enough of the spring force to let the friction pads slip enough to reach an equilibrium where the alternator speed stays fairly constant, and within its upper limit.

The belt and pulley experience fairly high acceleration forces, which are resisted more strongly by the alternator than low accelerations. Because of the orientation of the weights, the pads are jammed into the drum wall. However, the pads may still be chosen so as to slip on the drum wall during accelerations strong enough to otherwise exceed the belt's grip on the pulley, preventing belt slippage. During deceleration, the force of which is directed toward the slack side of the belt, the drum wall can slip past the pads, preventing belt slip at a lower threshold. Thus, the particular shape and orientation of the pivoted weights and pads allows a simple and compact clutch to provide several features.

It is, therefore, a general object of the invention to provide a clutch for indirectly driving a rotatable belt and pulley powered accessory that limits high speed operation to protect the accessory, and which also controls belt-pulley slippage.

It is another object of the invention to provide such a clutch through the use of specially sized and oriented, spring loaded pivoting weights and drum engaging friction pads. which respond both to speed and to the direction of belt acceleration.

It is another object of the invention to provide such a clutch that is particularly compact and efficient in operation.

DESCRIPTION OF THE PREFERRED EMBODIMENT

These and other objects and features of the invention will appear from the following written description, and from the drawings, in which.

Figure 1:
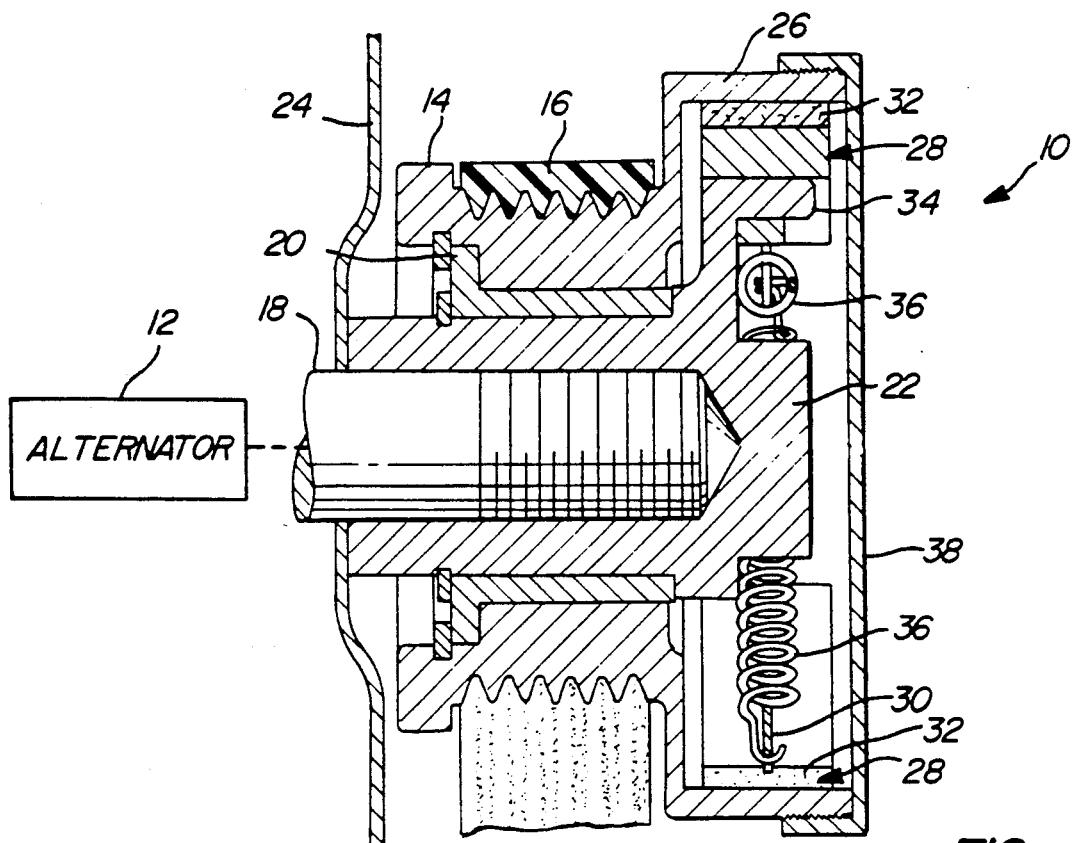
FIG. 1 is a cross sectional view through a preferred embodiment of the clutch according to the invention, showing the end of the alternator shaft in elevation and showing the alternator or other rotating member schematically.

Referring first to FIG. 1, a preferred embodiment of a clutch made according to the invention is indicated generally at 10. Clutch 10 is used to indirectly drive a rotatable member, in this case an alternator 12, which is subject to an upper speed limit, as described above. The power for clutch 10 comes from a belt pulley 14 that is wrapped by a conventional multi V drive belt 16. Pulley 14 and clutch 10 drive alternator 12 by driving its central shaft 18, which defines a central axis. Pulley 14 is supported for free rotation coaxial to shaft 18 on a bronze bushing 20, which in turn surrounds a generally cylindrical support 22 threaded to the end of alternator shaft 18. Support 22 rotates with shaft 18, serving as a foundation for other structure described below. In addition, part of a cooling fan 24 is shown, which would turn with shaft 18.

Figure 2:
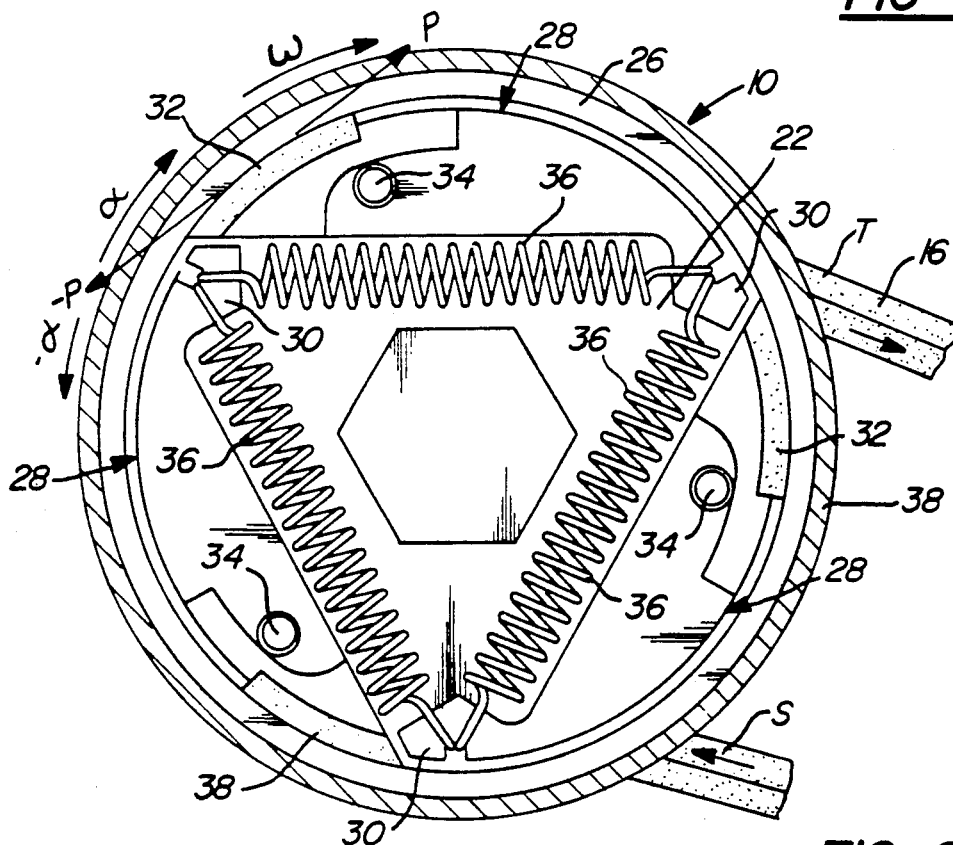
FIG. 2 is an end view of the clutch, showing a portion of the belt run to illustrate the slack and tight side and showing the configuration of the weights at a rotational speed too low to cause significant centrifugal effect.

Referring next to FIG. 2, belt 16 runs in the direction shown by the arrows, and so drives pulley 14 always clockwise, as indicated by the arrow and ω. While the direction of rotation of pulley 14 is always the same, the magnitude of its rotational speed can vary considerably, along with speed of the crankshaft pulley, not illustrated, that drives belt 16. Both the magnitude and direction of the acceleration of pulley 14 also vary considerably, for the same reason. Belt 16 runs with a tight side T and a slack side S, and while its multi V configuration gives it a superior gripping force on pulley 14, it may still slip. This could occur, if pulley 14 drove shaft 18 and alternator 12 directly, because of the significant resistance of alternator 12 to being rapidly accelerated or decelerated. This acceleration dependent resistance to rotation, measured in torque units, results both from rotational inertia and from the counter emf voltage of the generator, and is a given for any alternator. Alternator resistance to deceleration or braking flows primarily from rotational inertia, and is generally not as great. Likewise, the deceleration forces experienced by belt 16 are generally not as great as the acceleration forces. Nevertheless, belt slip 16 may be more likely to occur when it decelerates and attempts to brake alternator 12. This is because the direction of deceleration is toward the slack belt side S. Just as a rope may take more force in tension than it can in compression, so is belt 16 more likely to slip on pulley 14 when stressed toward the slack side S. The invention takes the acceleration-deceleration differential into account.

Figure 4:
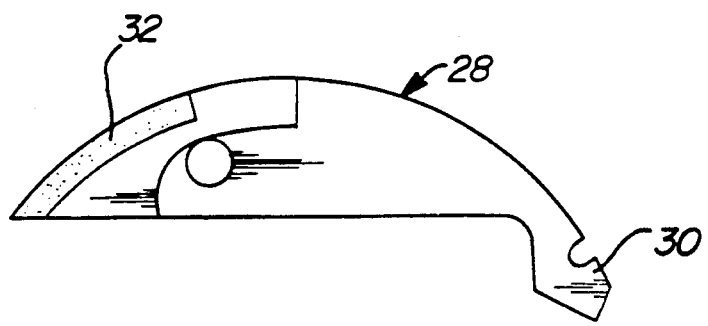
FIG. 4 is a view of one of the weights alone.

Referring next to FIGS. 1, 2 and 4, clutch 10 includes a cylindrical drum wall 26 surrounding shaft support 22 that is integrally formed with pulley 14, serving as a larger diameter extension of it, in effect. A plurality of three identical weights, indicated generally at 28, each has the basic shape of a segment of a circle of slightly smaller diameter than drum wall 26. Each also subtends approximately 120 degrees. Consequently, when the three weights 28 are evenly arranged inside of drum wall 26, they form a circle concentric thereto, but with some radial clearance. One end of each weight 28 comprises a small hook 30, and the other end mounts an arcuate friction pad 32. Each pad 32 consists of a wear resistant material with a known coefficient of friction, such as brake pad material, and is shaped so as to conform closely to drum wall 26. Each weight is pivoted to support 22 by one of three evenly spaced pins 34, each of which is parallel to the central axis of shaft 18. Pin 34 does not bisect weight 28, however, but is deliberately offset toward the pad 32. Each weight 28 is also oriented such that the direction of rotation of shaft 18 runs from pad 32 to hook 30. With weights 28 pinned in place, a tension spring 36 is hooked between each pair of hooks 30, forming a triangular pattern. Each weight 28 is thereby given a continual clockwise rotational bias about its pin 34, which would tend to push each pad 32 into drum wall 26 with a normal force proportional to the tension in spring 36. Finally, a cover plate 38 is attached over the outside of drum wall 26 to protect the weights 28 and springs 36 from the environment.

Figure 5:
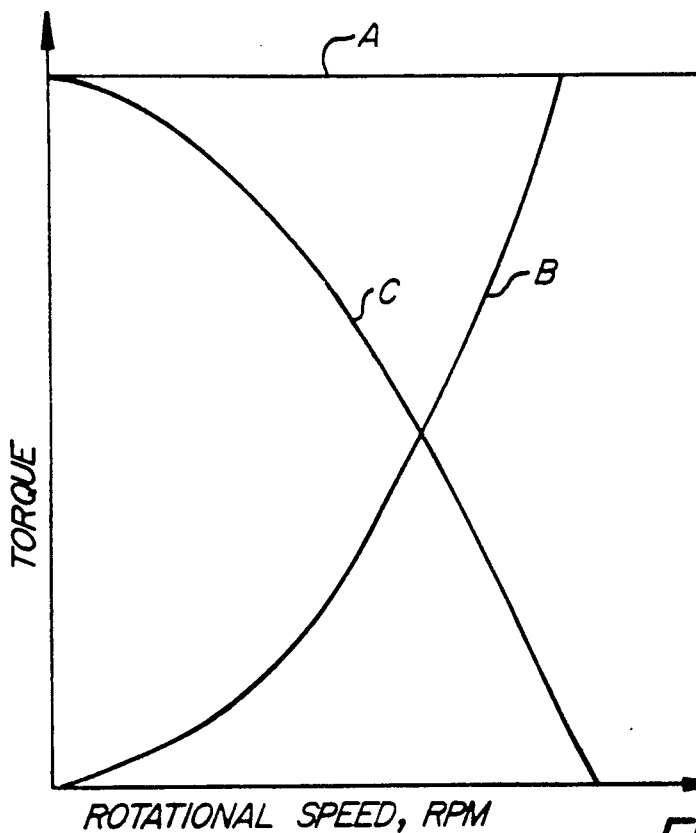
FIG. 5 is a graph showing how the opposing centrifugal and spring forces contribute to the net torque transmitted by the clutch at various rotational speeds, when the belt and pulley are experiencing either a constant speed, or accelerating.

Referring next to FIGS. 5, a graphic representation of the countervailing influences of the tension springs 36 and centrifugal force is presented. A characteristic net torque curve, which is what can be transmitted from pulley 14 (and drum 26) to shaft 18, is shown as a function of the rotational speed of shaft 18. Actual values will vary from case to case, but the general shape and trend, which would apply to any case, can be described. The straight line A indicates the torque contribution made just by the springs 36. The frictional force, for any given coefficient of friction, is proportional to the normal force between the pads 32 and the surface of drum wall 26, which in turn is proportional to the pulling force of the springs 36. The spring contribution can be changed by using stronger springs, stretching them more, but it is a constant over the relevant rotational speed range. The upwardly curved line represents the absolute value of the torque subtraction caused by centrifugal effect. Because of the off center location of the pivot pins 34, each weight 28 is asymmetrically arranged, with more weight toward the end with hook 30. Consequently, as shaft 18 (and support 22) rotates faster, the weight 28 tends to pivot counterclockwise in opposition to the force of the springs 36, decreasing the normal force at the pad 32-drum wall 26 interface. This reduces the frictional force and the torque transmitted, regardless of whether the pad 32 perceptibly moves away. The net effect is the graph C. At some speed of rotation, the effect of springs 36 will be totally negated, and no torque will be transmitted. It should also be understood that the net torque transmission curve in FIG. 5 illustrates the situation where belt 16 (and pulley 14) undergoing neutral or positive acceleration, although the curve is independent of the magnitude of the acceleration.

Figure 3:
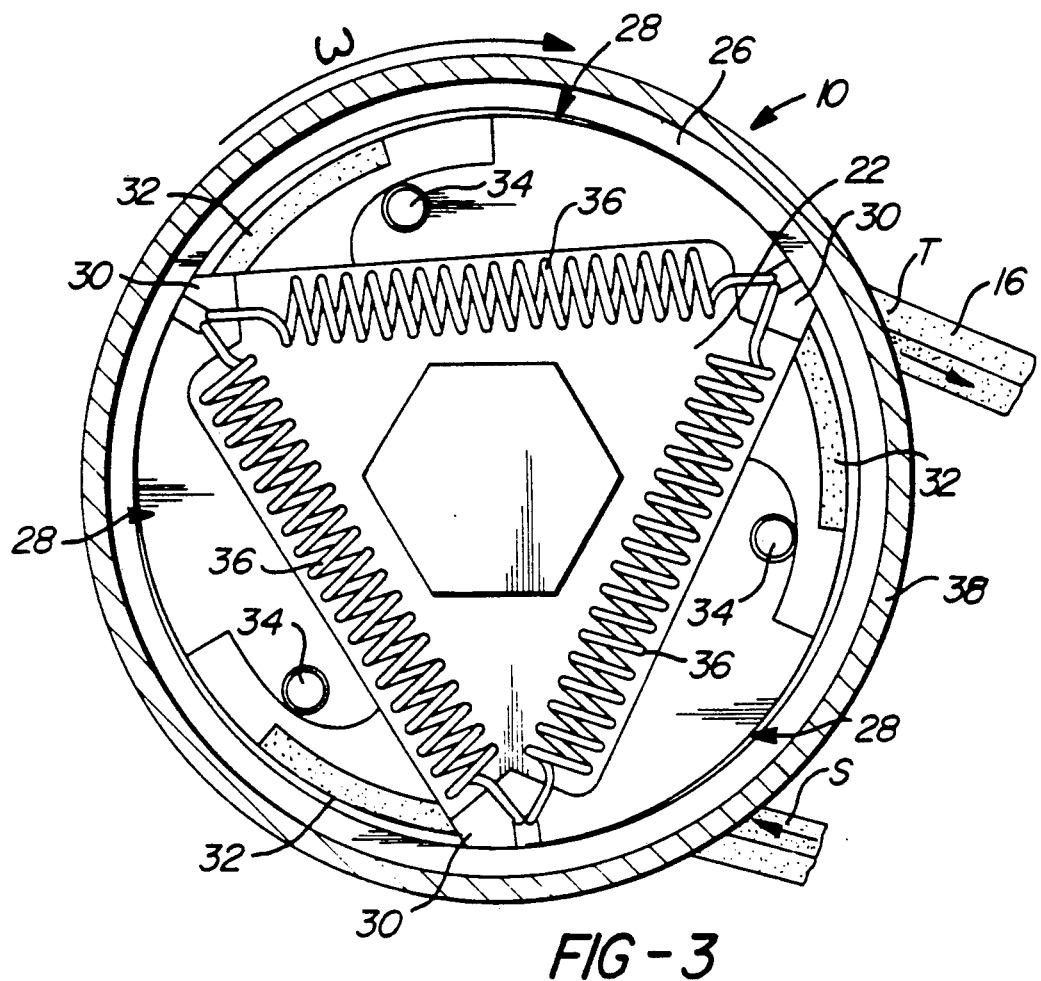
FIG. 3 is a view like FIG. 2, but showing the configuration of the weights in response to high speed.
Figure 7:
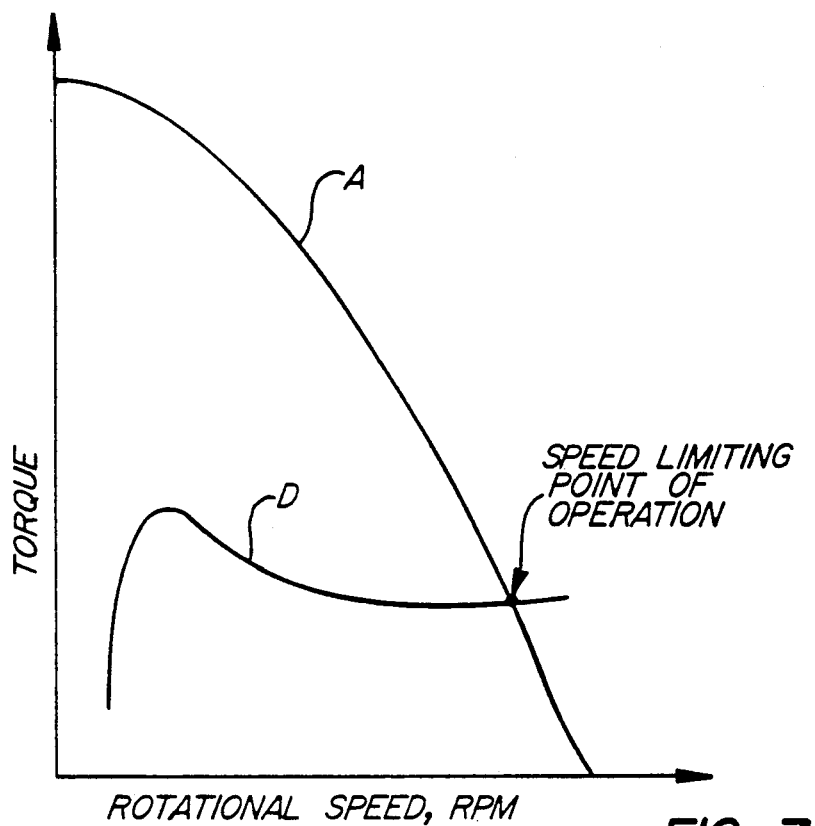
FIG. 7 is a graph showing how the net torque curve of the clutch intersects the drive torque curve of the alternator at some moderate acceleration to create a speed limited point of operation.

Referring next to FIGS. 3 and 7, the operation of the invention as a speed limiter is illustrated. The curve D shows the torque necessary to drive the alternator 12 at various speeds, which is a characteristic curve that varies with any given alternator. The curve shown is particular to some moderate alternator acceleration, and would be higher for a higher acceleration. At some speed, the two will cross, which represents the speed beyond which the pads 32 will have pivoted enough, see FIG. 3, to slip enough on drum wall 26 so as to transmit substantially no more torque. Beyond that point, the speed of alternator 12 will remain substantially constant. This is a point that is approached continuously, reaching a pad slippage equilibrium, and is not an on-off phenomenon. Knowing the upper speed limit beyond which alternator 12 should not run, and knowing curve D for any given alternator 12, the designer would choose the strength of springs 36, the material for pads 32, and the distribution of weight 28 so as to yield the curve A that would in turn cross curve D at the desired point. With the capability of limiting the higher speeds, the pulley ratio can be freely chosen to be as high as is needed to produce adequate output at lower speeds.

Figure 8:
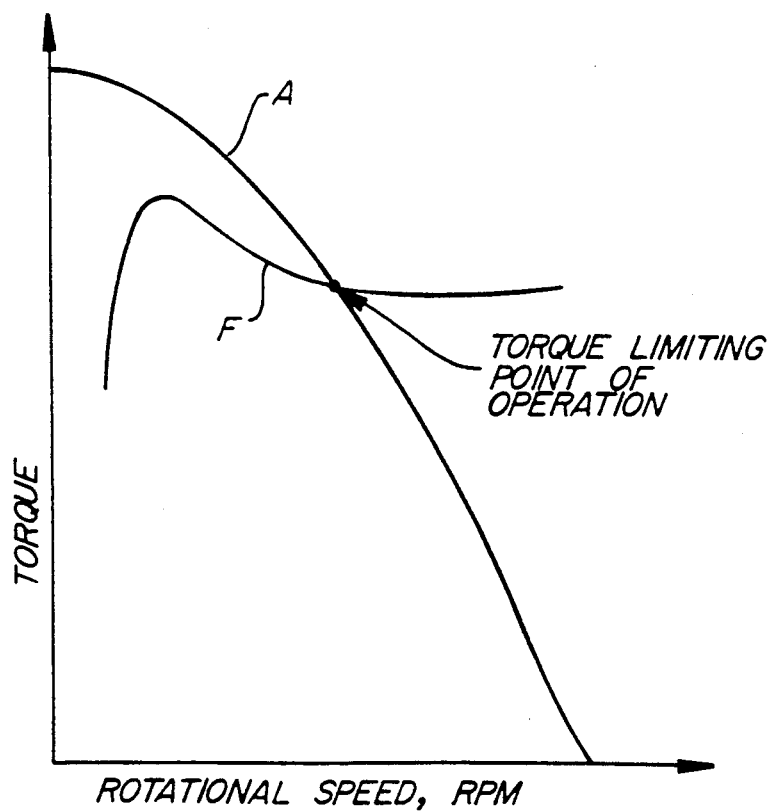
FIG. 8 is a graph showing how the acceleration net torque curve of the clutch intersects the drive torque curve of the alternator at a high acceleration to create a torque limited point of operation.

Referring next to FIGS. 2 and 8, the operation of the invention as a torque limiter is illustrated. When the belt 16 and pulley 14 are undergoing high acceleration, the acceleration force, shown by the arrow α in FIG. 2, is directed clockwise, the same as the force P of the drum wall 26 on the friction pads 32. The force P tends to rotate weights 28 clockwise, causing the pads 32 to jam or self lock against the drum wall 26. Still, there is a point where the pads 32 will slip on drum wall 26, despite the jamming action. The torque resistance of the alternator 12 to being rotated is higher for higher acceleration rates, as shown by characteristic torque curve F in FIG. 8, and there would be a family of such curves. Therefore, torque related clutch slippage can actually occur at lower speeds than centrifugal, speed related slippage. The pads 32 will slip until the alternator 12 slows down enough to reduce its torque resistance enough that the pads 32 will stop slipping. This is desirable, because if the pads 32 did not slip, the resistance of the alternator 12 could instead cause the belt 16 to slip on the pulley 14. The torque curve of clutch 10 is chosen such that the pads 32 will slip before belt 16 does.

Figure 6:
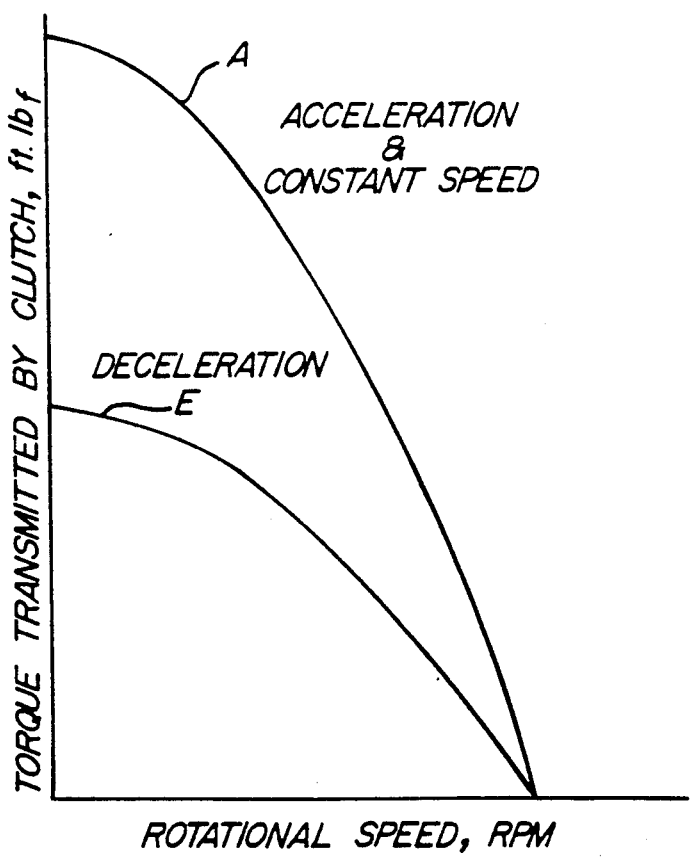
FIG. 6 is a graph showing the net torque transmitted by the clutch when the belt and pulley are experiencing deceleration as compared to the net torque curve of FIG. 5.

Referring next to FIGS. 2 and 6, it may be seen that the clutch of the invention has a different, lower net torque curve for deceleration than for acceleration, labeled E. This is because of the specific orientation of the weights 28 and pads 32. When belt 16 (and pulley 14) are decelerating, due to engine deceleration, that deceleration −α is directed counterclockwise, as is the force of drum wall 26 on pads 32, −P. This tends to rotate the weights 28 counterclockwise, allowing the drum wall 26 to slip past the pads 32, rather than jamming. The torque limiting point of operation in deceleration, while not specifically illustrated, would therefore be achieved at a lower speed than in acceleration. This differential response is an advantage in that deceleration force is directed toward the belt slack side S, which is more prone to slipping on pulley 14. Therefore, slippage of belt 16 in both directions can be avoided. Torque limitation and speed limitation occur independently, but the two features are provided cooperatively by the same structure.

Variations in the preferred embodiment could be made. The invention would work with any rotatable member that was subject to the same problems as alternator 12. Belt 16 should be considered broadly enough to include chains and other drive means which, while they do not slip exactly as a belt does, do have grip limitations. If, for some reason, belt 16 were tensioned such that it did not have a significantly slack side, then the differential response of the clutch 10 to acceleration and deceleration would not be as important, and the weights 28 could potentially be pivoted in either orientation. If more axial room were available inside of drum wall 26, then the weights 28 could be larger that 120 degrees, and arranged in a stacked pattern. Likewise, the springs 36 could be anchored to the support 22, rather than mutually between the three hooks 30. However, the specific embodiment shown, with the weights 28 sized and arranged as shown in a plane, is particularly compact, occupying minimal space. Therefore, it will be understood that it is not intended to limit the invention to just the embodiment disclosed.

The embodiments of the invention in which an exclusive property or privilege is claimed are defined as follows:

1. For use with a rotatable member having an acceleration dependent resistance to rotation and an upper rotational speed limit, and which is powered by a pulley driven about a central axis by a belt that runs at speeds above said upper limit and that experiences high acceleration forces that are resisted by said rotatable member sufficiently to exceed the grip of said belt on said pulley and cause said belt to slip on said pulley if said pulley drives said rotatable member directly, a clutch mechanism for indirectly driving said rotatable member, comprising, a cylindrical drum wall connected to said pulley for co-rotation about said axis, a friction pad shaped so as to engage said drum wall with a frictional force dependent on a normal force between said pad and drum wall, at least one centrifugal weight pivoted to said rotatable member so as to turn about a pivot parallel to said central axis, said weight being asymmetrically distributed relative to said pivot so that said weight pivots in one direction to pull said friction pad away from said drum wall and decrease said normal force proportional to the centrifugal force imposed on said weight as said member rotates, and, a resilient means having a strength sufficient to push said friction pad continually toward said drum wall in opposition to said centrifugal force with a predetermined normal force, the strength of said resilient means and weight distribution of said centrifugal weight being chosen relative to one another to create a net frictional force of said friction pad against said drum sufficient to drive said rotating member substantially one-to-one with said pulley when said member rotates slowly, but to slip sufficiently when said rotating member approaches said upper speed limit to prevent said speed limit from being reached and also to slip in response to high acceleration forces before the grip of said belt is exceeded to prevent belt slippage.

2. For use with a rotatable member having an acceleration dependent resistance to rotation and an upper rotational speed limit, and which is powered by a pulley driven about a central axis by a belt that runs at speeds above said upper limit and that experiences high acceleration forces that are resisted by said rotatable member sufficiently to exceed the grip of said belt on said pulley and cause said belt to slip on said pulley if said pulley drives said rotatable member directly, a clutch mechanism for indirectly driving said rotatable member, comprising, a cylindrical drum wall connected to said pulley for co-rotation about said axis, a plurality of centrifugal weights pivoted to said rotatable member so as to turn about axes parallel to said center axis, each of said weights having an arcuate friction pad at one end shaped to conform to said drum wall and a spring hook at the other and further being asymmetrically distributed toward said spring hook so that said weight pivots in one direction to pull said friction pad away from said drum wall and decrease said normal force proportional to the centrifugal force imposed on said weight as said member rotates, resilient springs interconnecting each adjacent pair of hooks with a strength sufficient to give each weight a continual rotational bias that pushes its friction pad continually toward said drum wall in opposition to said centrifugal force with a predetermined normal force, the strength of said springs and the distribution of said centrifugal weight being chose relative to one another to create a net frictional force of said friction pad against said drum sufficient to drive said rotating member substantially one-to-one with said pulley when said member rotates slowly, but to slip sufficiently when said rotating member approaches said upper speed limit to prevent said speed limit from being reached and also to slip in response to high acceleration forces before the grip of said belt is exceeded to prevent belt slippage.

* * * * *